Dec. 7, 1965    P. E. VESILIND    3,221,369
EXTRUSION MACHINE
Filed July 1, 1963
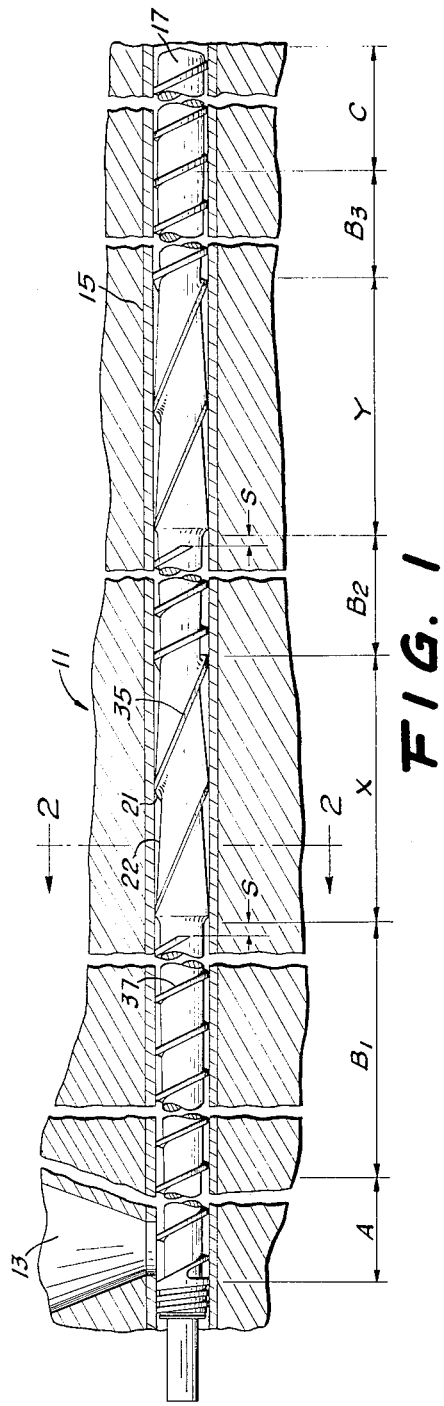
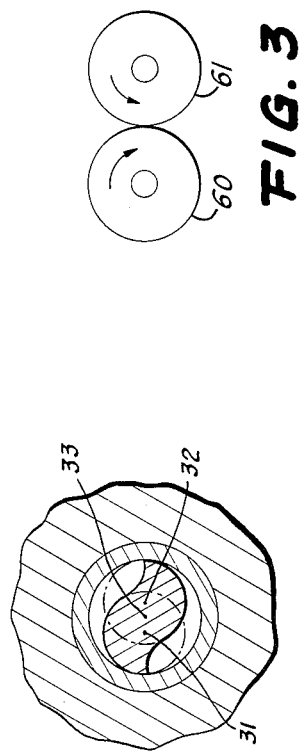
INVENTOR.
PAUL E. VESILIND
BY
Oscar B Brumback
his Attorney

United States Patent Office 3,221,369
Patented Dec. 7, 1965

3,221,369
EXTRUSION MACHINE
Paul E. Vesilind, Beaver, Pa., assignor to Koppers
Company, Inc., a corporation of Delaware
Filed July 1, 1963, Ser. No. 291,895
2 Claims. (Cl. 18—12)

This invention relates generally to plastic extrusion machines and more particularly to an extrusion screw for working and forcing thermoplastic material through an extrusion machine.

Extrusion is a processing step widely used in the plastics industry. The extruder generally is comprised of a cylindrical barrel having a hopper at one end and a die at the other end. A helical screw rotates in the barrel to force thermoplastic material from the hopper through the barrel and out the die. Since the kind and type of ingredients have a great influence on the operation of the extruder and on the material extruded from the dies, it is customary to mill the ingredients to thoroughly mix and plasticize the thermoplastic material so that it will extrude properly. After this milling, the material is inserted into an extruder which extrudes the material while the material is in a plastic condition. This working is relatively expensive and requires the transfer of the material from one machine to another.

The extrusion of polyethylene is typical of the foregoing operations. If the plastic material is to be used as film for packaging purposes, it is desirable that the film be as clear as possible so that the consumer can see the nature of the article in the package. Polyethylene, however, has a tendency to be hazy due to small translucent or opaque spots known as gel or fish-eyes. To overcome these conditions, it has been necessary heretofore to subject the polyethylene to intense shearing and mixing first in a mill to obtain a clear transparent product. The experience of those working in the art as described by Robert E. Cairns in Patent No. 2,776,274 is:

"Even the ordinary extrusion processes which would be expected to give intensive mixing under pressures are insufficient and practically useless for removing the fish-eyes."

It has now been found, in accordance with this invention, that a novel extrusion screw can accomplish in an extruder the intensive mixing effect of milling and working.

The novel screw of this invention is obtained by interrupting the compression section of an extruder screw which has the conventional feeding, compression and metering sections to interpose a working section in the nature of a long pitch screw whose flight has its leading edge gently tapered to trailing edge of the preceding thread to force the plastic over the top of the flight rather than pushing it ahead of the flight.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

In the drawings wherein like parts are marked alike:

FIGURE 1 illustrates in an exaggerated scale an embodiment of the novel extruder screw of the invention;

FIGURE 2 is a cross-section of the screw of FIGURE 1 taken at section II—II and also highly exaggerated to illustrate the action of the working section;

FIGURE 3 illustrates the action of a mill for plastic material.

The extruder indicated generally at 11 in FIG. 1 comprises a feed hopper 13 for plastic material at one end of a cylinder 15 with a die (not shown) at the other end, and a screw 17 rotatable in the cylinder. Conventionally, the extruder may include a jacket around the cylinder that is provided with passages through which suitable heat exchange medium may be circulated during extrusion operations for the purpose of controlling the temperature of the plastic material. Extruder screw 17 also, if desired, may be hollow so as to circulate a suitable heat exchange medium within the screw for the purpose of controlling the temperature thereof. The bore of cylinder 15 is smooth walled and has a uniform diameter along its entire length.

The screw 17 is connected to a suitable prime mover (not shown) for rotation. The turning of the screw 17 forces the plastic compound from hopper 13 through the bore of cylinder 15 and out the die. The screw 17 has, as is conventional, a feed zone A for receiving plastic material from hopper 13 for passage through the barrel; a zone B for compressing the plastic and as a result of this compression and the heat supplied by the heat exchange medium in the barrel of the extruder rendering the thermoplastic material into a molten mass; and a zone C for metering a constant amount of the plastic material for flowing through the extruder die.

The foregoing extruder structure is conventional and is well known in the art. While such structure does impart a certain amount of mixing and pressure to the plastic being extruded, in the case of polyethylene, the mixing is not enough to appreciably change the characteristics of the polyethylene.

In accordance with this invention, a novel extruder screw is provided which by extrusion alone so mixes and works the plastic material as to dispense with the necessity for milling the material prior to the extrusion operation. This is accomplished in accordance with this invention by interrupting the compression sections with working sections X and Y. It is advantageous to provide a short compression section $B_2$ between these sections X and Y to compensate for any pressure loss that may be occasioned by these working sections. Also advantageously, a short space S is provided between the compression sections and the working sections so as to permit the polymer to be distributed under pressure completely around this working section.

The working sections X and Y are identical. Each comprises double threads of elongated pitch, the trailing faces of each of which slopes downwardly rearward at an angle of less than 90°, and whose leading face merges at a gentle angle with the rise of the trailing face of the other thread. In the illustrated embodiment, the double threads are diametrically opposite so as to provide a balanced action screw. Thus, in accordance with this invention, trailing face 21 of one of the threads, or helical fins which constitutes a flight, slopes downwardly rearward at an angle of 30°-60° to the axis of the screw. The leading face 22 of this thread then slants downwardly forward to merge with the trailing face 21 of the other thread at a gentle angle of between 2° and 5°.

As illustrated in FIG. 2, the working portion of this invention can be considered a twisted or helical eccentric. The two faces being diametrically opposed have the effect of two twisted eccentrics having centers 31 and 32 equally and oppositely spaced in the same cross-sectional plane about the axis 33 of the screw.

The pitch of flight 35 of the working section is elongated. For example, while flight 37 is, for example, a typical box pitch, that is, the pitch is substantially equal to the diameter of the screw, the pitch of flight 35, as illustrated, is five times greater than that of flight 37. This ratio is not particularly critical and may range from 3 to 10. Also, while the embodiment herein is illustrated as having two of these elongated threads, it is obvious that more, 3, 4, 5, 6, 7, etc., may be used if desired.

In operation, the plastic material, as particles or molten mass, is fed into the hopper 13. The flights of section A then pass onto section B a measured amount. It remains or becomes a molten mass as it passes through section $B_1$ where a compressive force is applied to the mass. As the mass goes to section X, it is flowed along the screw by the action of the long threads, but the greater tendency is to pass the mass over the flights 35 and be worked between the face of the flight and the wall of the barrel. This provides an intense mixing and shearing action on the plastic material, seemingly providing an action equivalent to that obtained by the pair of rolls of a mill as diagrammatically shown in FIG. 3. From section X, the material is again subjected to pressure at zone $B_2$ and then applied to identical working in section Y. Thereafter, the material passes from section Y into compressive section $B_3$ and out metering section C through the die of the extruder.

As an example of an extruder according to this invention, the flights of the screw have a general diameter of 2.495 inches. The clearance between the flights and the barrel is 0.005. The overall length of the screw flights is 75.00 inches. The length of each working flight, such as X and Y, is 12.500 inches. The trailing face of the flight slopes downstream at the rate of 2°32′. As viewed in FIG. 1, this means the left-hand side of the flight has a diameter of 2.495 inches and the right-hand side contiguous to the next adjacent flight is 0.250 inch lower. A ⅝ inch gap is permitted between the ending of the thread of the compression flight and the beginning of the thread of the working flight.

An extruder such as having the dimensions described above is used to illustrate the action of the novel extruder of this invention. An aliquot of polyethylene is fed through the novel extruder of this invention and other aliquots are fed through mixers such as the Bolling mixer and the Ko-Kneader mixer. The "haze value," according to the ASTM Standard D 1003–61 adpoted in 1961, is used for comparison purposes for the reason that this is a readily duplicated value. Different operators with different equipment can duplicate results within ±0.3%.

The haze of a specimen is that percentage of transmittal light, which, in passing through the specimen, deviates from the incident beam by forward scattering. Only the light deviating more than 2.5° from the average is considered to be haze. A speciment that is extremely hazy, of course, is readily apparent to the eye without the test apparatus.

Aliquots of polyethylene having an initial haze value of 5.4% were used as feedstocks for the mills sold under the trade name Ko-Kneader, Bolling, and "German mills," as well as for the extruder of this invention. The haze of the resulting product from the respective mills was 4.9, 4.9, and 4.8, respectively. The haze value of the product from the extruder was 4.9.

The procedure was repeated but using aliquots of polyethylene having a haze value of 6%. The resulting material from the Ko-Kneader had a haze value of 5.4; the resulting material from the Bolling mill had a haze value of 5.2; the resulting material from the "German mills" had a haze value of 4.6; and the resulting material from the extruder of this invention had a haze value of 4.9.

It has been found, in accordance with this invention, that the haze value of the product produced from the extruder having the novel screw remains substantially constant even though the production rate is changed through a wide range. For example, with an extruder having the dimensions described above, the production rate may be varied from 20–140 pounds per hour, and the resulting product remains substantially the same. It does not matter whether the feed to the hopper is pellets of polyethylene or whether the feed to the hopper is polyethylene in a molten state. The gross horsepower per pound per hour of product varies, of course, with the production rate per pound per hour. Thus with the extruder having the dimensions given above, at a production rate of 40 pounds per hour, the gross horsepower per pound per hour is 0.44; at 60 pounds per hour, the gross horsepower drops to 0.34 pound per hour; at 80 pounds per hour, the gross horsepower drops to 0.29 pound per hour; at 100 pounds per hour, the gross horsepower drops to 0.28 pound per hour; and at 120 pounds per hour, the gross horsepower drops to 0.27 pound per hour.

The foregoing, therefore, has presented a novel arrangement which enables an extruder not only to carry out the conventional extrusion of thermoplastic material from a die but also to carry out a milling operation on the material. This eliminates the need for milling the thermoplastic material prior to its being fed to an extruder. The additional requirement for milling heretofore has been a disadvantage in that mills are expensive, a transfer or handling of the material from the mill to the extruder is required, and the mills, themselves, require considerable attention to operate in a satisfactory manner. The novel extruder of this invention provides a continuous working action in a single unit. The extruder delivers the thermoplastic material forwardly as well as mixing it, and provides a continuous line of shearing and squeezing. The use of a plurality of working flights enables the screw to be dynamically balanced.

While the foregoing has particularly discussed the use of the novel extruder for the homogenizing of a polymer so as to increase its clarity, it will be recognized that the material may also be used for the homogenizing of mixtures of materials such as polymers or other thermoplastic materials with additives, such as, pigments, plasticizers and antioxidants, in the extruder, itself, prior to the extruding of the homogenized mixture.

I claim:

1. Apparatus for advancing and working plastic material in a hollow cylinder of uniform internal diameter comprising:

(a) a stock screw rotatable in said cylinder having at least one helical thread extending along a first portion of the length of said stock screw comprising a feed section for advancing said plastic material to a first (b) compression section disposed adjacent said feed section and comprised of at least one helical thread extending along a second portion of the length of said stock screw having a root diameter that gradually increases in the direction of movement of said plastic material along said cylinder whereby said plastic material is compressed between said stock screw and the inner wall of said cylinder and said compressed material is discharged from said compression section into (c) a distributing section adjacent said compression section wherein there are no helical threads and the compressed material is uniformly distributed around said stock screw and delivered to (d) a working section disposed adjacent said distributing section and comprised of one or more helical threads extending along a third portion of said stock screw, said threads having a pitch in the range of 3 to 10 times the pitch of the helical thread in said compression section and a leading face that uniformly slopes downwardly forward toward the axis of said stock screw at an angle in the range of 2° to 5°, said leading face merging with the arcuate trailing face of the next adjacent screw thread whereby the material delivered to said working section flows along said stock screw and passes over the crest of said elongate threads and is worked between the walls of said cylinder and the face of said screw thread, said material being thereafter delivered to (e) a second compression section substantially the same as said first compression section disposed adjacent said working section and extending along a fourth portion of said stock screw; and (f) a metering section disposed adjacent said second compression section and comprised of a screw thread extending along a fifth portion of said stock screw.

2. Apparatus for advancing and working plastic material in a hollow cylinder of uniform internal diameter comprising:

(a) a stock screw rotatable in said cylinder having one or more helical threads extending along the length of said screw for advancing plastic material seriately through a feed section, a first compression section, a first distributing section, a first working section, a second compression section, and a metering section;

(1) said feed section comprising at least one helical thread extending along a first portion of the length of said stock screw for advancing said plastic material to a first (2) compression section disposed adjacent said feed section and comprised of at least one helical thread extending along a second portion of the length of said stock screw having a root diameter that gradually increases in the direction of movement of said plastic material along said cylinder whereby said plastic material is compressed between said stock screw and the inner wall of said cylinder and said compressed material is discharged from said first compression section into (3) a first distributing section adjacent said first compression section, wherein there are no helical threads and the compressed material is uniformly distributed around said stock screw and thereafter delivered to (4) a first working section disposed adjacent said first distributing section and comprised of a plurality of helical threads extending along a third portion of said stock screw, said threads each having a pitch in the range of 3 to 10 times the pitch of the helical thread in said first compression section and a leading face that uniformly slopes downwardly forward along a straight line toward the axis of said stock screw at an angle in the range of 2° to 5°, said leading face merging with the arcuate trailing face of the next adjacent screw thread whereby the material delivered to said first working section flows along said stock screw and passes over the crest of said elongate threads and is worked between the wall of said cylinder and the face of said screw threads, said material thereafter being delivered to (5) a second compression section substantially the same as said first compression section disposed adjacent said first working section and extending along a fourth portion of said stock screw, said material being delivered from said second compression section to (6) a metering section disposed adjacent said second compression section and comprised of a screw thread extending along a fifth portion of said stock screw.

References Cited by the Examiner

UNITED STATES PATENTS

| | | | |
|---|---|---|---|
| 2,473,230 | 6/1949 | Van Riper | 18—12 |
| 2,496,147 | 1/1950 | Brillhart | 18—12 |
| 2,535,287 | 12/1950 | Gliss. | |
| 2,556,276 | 6/1951 | Henning | 18—12 |
| 2,693,348 | 11/1954 | Ellermann | 18—12 X |
| 2,765,490 | 10/1956 | Zona | 18—12 |

OTHER REFERENCES

Monsanto Public Information Bulletin No. 1029 (page 16), copyright 1956.

J. SPENCER OVERHOLSER, *Primary Examiner.*

MICHAEL V. BRINDISI, *Examiner.*